P. T. CHEEVERS.
DEVICE FOR ADJUSTING AND TESTING MOTOR VEHICLE BRAKES.
APPLICATION FILED AUG. 23, 1917.
1,282,190.
Patented Oct. 22, 1918.
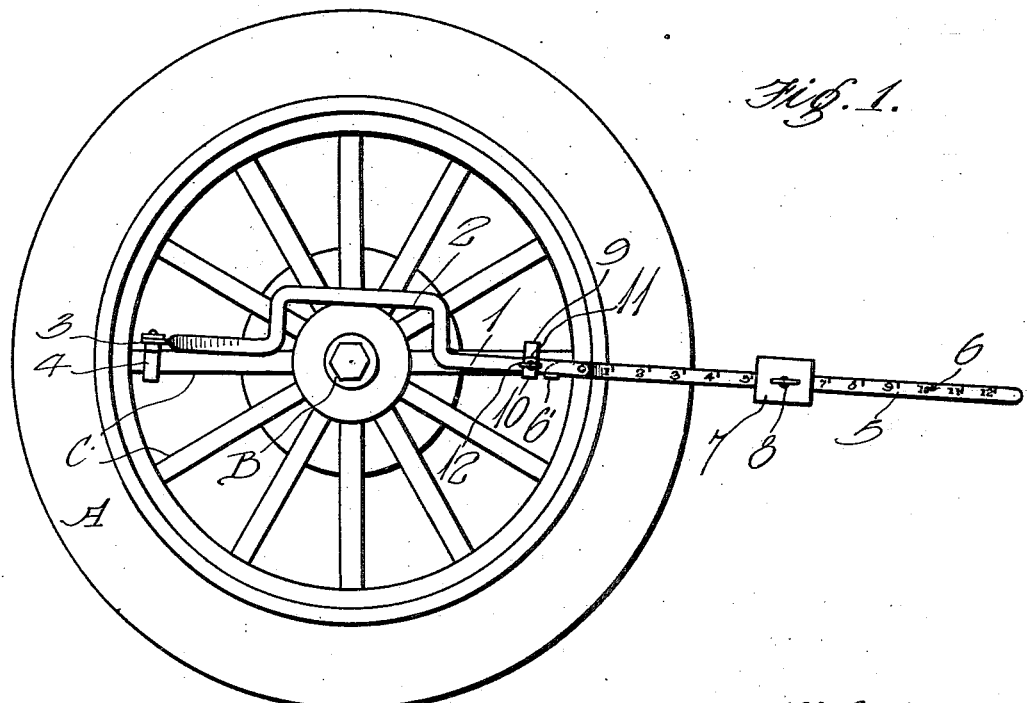
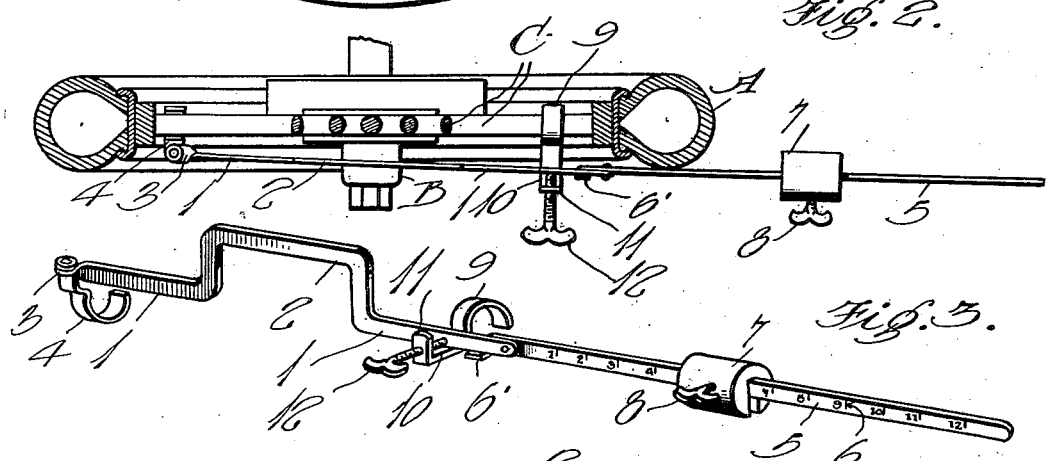
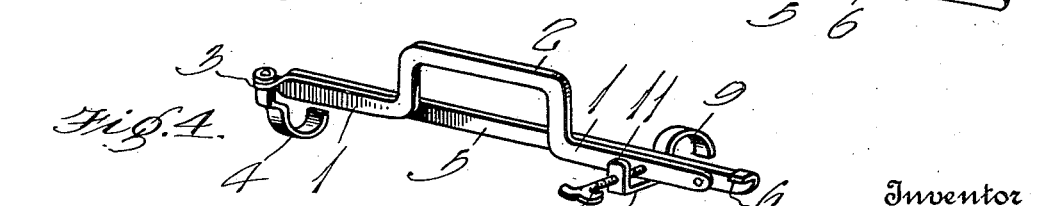
Witness
H. Woodard
Inventor
P. T. Cheevers
By H. B. Willson & Co.
Attorneys

UNITED STATES PATENT OFFICE.

PATRICK THOMAS CHEEVERS, OF FOREST CITY, PENNSYLVANIA.

DEVICE FOR ADJUSTING AND TESTING MOTOR-VEHICLE BRAKES.

1,282,190.

Specification of Letters Patent.

Patented Oct. 22, 1918.

Application filed August 23, 1917. Serial No. 187,399.

*To all whom it may concern:*

Be it known that I, PATRICK THOMAS CHEEVERS, a citizen of the United States, residing at Forest City, in the county of Susquehanna and State of Pennsylvania, have invented certain new and useful Improvements in Devices for Adjusting and Testing Motor-Vehicle Brakes; and I do declare the following to be a full, clear, and exact description of the invention, such as will enable others skilled in the art to which it appertains to make and use the same.

This invention relates generally to motor vehicle accessories, and more particularly to a device for testing and adjusting the brakes of a motor vehicle.

The primary object of the invention is to provide a device by which the strength of the brakes of the wheels of the motor vehicle can be tested or measured so that the brake on either driving wheel of the vehicle may be adjusted so that its braking efficiency equals that of the opposite wheel.

Another object of the invention is to provide a device for testing the brakes of motor vehicles which can be readily and easily attached to or removed from the wheels of the vehicle, and which is so constructed that it may be fitted to wheels of various sizes.

A further object of the invention is to provide a brake testing device for motor vehicles, including as one of its parts a comparatively long beam on which is slidably mounted a weight, said beam being hingedly connected to the portion of the device which is clamped to the wheel of the vehicle; so that, when the device is not in use, the beam may be folded along one side of said portion of the device to form a comparatively small and compact article which can be carried at all times in the vehicles without inconvenience, or which can be packed away in a comparatively small space.

A still further object of the invention is to provide a device of this class which will be simple, strong, durable and inexpensive in construction, efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings, forming a part of the application, and in which similar reference characters designate like parts throughout several views:

Figure 1 is a side elevation of an automobile wheel, having a device constructed in accordance with this invention applied thereto.

Fig. 2 is a horizontal sectional view of the automobile wheel, showing the brake testing device applied thereto in top plan view.

Fig. 3 is a perspective view of the brake testing device detached from the wheel and in open or extended position: and, Fig. 4 is a similar view of the brake testing device in closed or folded position.

Referring more particularly to the drawings, the letter A, designates an automobile wheel, B the hub thereof, and C spokes. Clamped to the wheel in a manner to be hereinafter described is a bar 1, said bar being preferably made of a flat strip of iron or other suitable metal and having a laterally offset portion 2 at its middle portion. The portion 2 is of greater length than the greatest width or diameter of the hub B of any automobile wheel. One end of the bar 1 is twisted to form an ear 3 lying in a plane at right angles to the major part of the bar, and pivotally secured to the ear 3 is a hook which is upwardly concaved to engage the lower side of a spoke C.

Hinged or pivoted to the other end of the bar 1 is a bar or beam 5 having graduations 6 thereon. The inner end of the beam 5 is provided on its lower edge with a laterally extending lug 6', which engages the lower edge of the bar 1 when the beam 5 is extended in longitudinal alinement with the ends of said bar to maintain said beam in this position. Slidably mounted upon the beam 5 is a weight 7. A set-screw 8 extends through one side of the weight 7 and engages the adjacent side of the beam, to lock said weight in its adjusted position upon said beam.

The reference numeral 9 represents a hook which is formed integrally with an arm 10 which extends from one end thereof and has its free end upturned as shown at 11, and this element 11 has threaded engagement with a set-screw 12. The hook 9 and parts integrally connected with the same are not permanently connected with either the bar 1 or the beam 5, but are primarily separate from the same. The set-screw 12 extends toward one side of the hook 9, and this side of the hook acts as one element of a clamp. The integrally united elements 9, 10 and 11, together with the screw 12, form what may well be termed a clamp-hook element.

In attaching the testing device to an automobile wheel, the bar 1 is disposed in a substantially horizontal position, and the hook 4 is engaged under one of the spokes C adjacent to the outer end of said spoke. The hook 9 is then hooked over the diametrically opposite spoke C and the bar 1 is rested upon the arm 10 which is formed integrally with the hook member 9. The set screw 12 is then operated until either the bar 1 or the beam 5 is brought to bear against the adjacent side of the wheel, it being understood that the beam 5 is disposed in its extended position. The laterally offset portion 2 of the bar 1 straddles the hub B of the wheel as clearly shown by Fig. 1 of the drawings.

The automobile is then hoisted so that the wheel A will clear the ground, and the brakes of the vehicle are then lightly applied. The weight 7 is then slid along the beam 5 until the force of gravity of the weight acting upon the beam will overbalance the friction between the brake drum and the brake band and cause the wheel to move. The set screw 8 is then tightened so that the weight 7 will be locked in this position upon the beam. The device is then taken off of this wheel and placed upon the other wheel, and by adjusting the tension of the brake band of said other wheel, the friction between the latter and its brake drum can be made to equal the friction of the wheel first tested. By this means equal braking pressure will be exerted upon both of the driving wheels of the automobile, and hence the tires of the same will be evenly worn.

By having the hook member 4 pivotally connected to one end of the bar 1, and the hook member 9 adjustable longitudinally and laterally with respect to the other end of the bar, and also by having the laterally offset portion 2 of said bar considerably wider than the greatest diameter of the hub B, the device can be applied to automobile wheels of various diameters and having various sizes of hubs and tires.

Whenever the device is not in use, the beam 5 may be swung on its pivot along one side of the end portions of the bar 1, and maintained in this position by using the clamp hook member 9 as a clamp, one side of said hook portion being brought into engagement with the beam 5 while the set screw 12 is adjusted until it engages the outer side of the bar 1. The device can then be carried in the vehicle without inconvenience or may be packed away in a comparatively small space.

From the foregoing description taken in connection with the accompanying drawings, the construction, use and operation of the device will be readily understood without a more extended explanation.

As various changes in form, proportion, and in the minor details of construction, may be resorted to without departing from the spirit of this invention, it is to be understood that I do not wish to be limited to the construction herein shown and described other than as claimed.

I claim—

1. In a device for testing the braking efficiency of automobile wheel brakes, the combination of a beam, a weight adjustable along said beam, and spoke-engaging means reversible relative to said beam and adapted for attaching said beam first to one and then to the other of two opposite driving wheels of an automobile.

2. In a device for testing the braking efficiency of automobile driving wheel brakes, the combination of a beam, a weight adjustable along said beam, means to engage with the upper side of a spoke of an automobile driving wheel, means to engage with the lower side of a spoke of said wheel, and means to connect the first said means with the second said means and to coöperate therewith for supporting said beam and weight on said wheel.

3. In a device for testing the braking efficiency of automobile driving wheel brakes, the combination of a beam, a weight adjustable along said beam, means to engage with the upper side of a spoke of an automobile driving wheel, means to engage with the lower side of a spoke of said wheel, means to connect the first said means with the second said means and to coöperate therewith for supporting said beam and weight on said wheel, the first and second said means being reversible for rendering the testing device equally attachable to the right hand driving wheels and the left hand driving wheels.

4. A device of the class described comprising a bar having a laterally offset portion intermediate of its ends, means at the ends of said bar for detachable engagement with the spokes of a vehicle wheel, a beam extending from one end of said bar and a weight slidably mounted upon said beam.

5. A device of the class described comprising a bar having a laterally offset portion intermediate of its ends, oppositely disposed hooks at the ends of said bar, one of said hooks being adapted to hook under and the other over diametrically opposite spokes of a vehicle wheel to removably attach said bar thereto, a beam extending from one end of the latter, and a weight slidably mounted upon said beam.

6. A device of the class described comprising a bar having a laterally offset intermediate portion an upturned hook pivotally connected to one end of said bar, and adapted to hook under one of the spokes of a vehicle wheel, a downturned hook at the other end of said bar and removable toward and away from the same said down turned hook being adapted to hook over the diametrically opposite spoke of the vehicle wheel, a beam extending from one end of said bar, and a weight slidably mounted upon said beam.

7. A wheel brake adjusting device comprising a bar provided with means whereby it may be detachably connected to a vehicle wheel, a beam pivotally mounted at one end of said bar and provided with means whereby it may be secured in longitudinal alinement with the same, and a weight slidably mounted upon said beam.

In testimony whereof I have hereunto set my hand in the presence of two subscribing witnesses.

PATRICK THOMAS CHEEVERS.

Witnesses:
FRANK W. WALKER,
JOHN T. BRINK.